(12) United States Patent
Zhang et al.

(10) Patent No.: US 10,643,648 B2
(45) Date of Patent: May 5, 2020

(54) ANTI-REFLECTION DATA STORAGE MEDIUM

(71) Applicant: Seagate Technology LLC, Cupertino, CA (US)

(72) Inventors: Li Hong Zhang, Singapore (SG); Xiong Liu, Singapore (SG); Swee Chuan Gan, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 255 days.

(21) Appl. No.: 15/197,913

(22) Filed: Jun. 30, 2016

(65) Prior Publication Data

US 2018/0005658 A1 Jan. 4, 2018

(51) Int. Cl.
| | |
|---|---|
| *G11B 5/66* | (2006.01) |
| *G11B 5/725* | (2006.01) |
| *G11B 5/84* | (2006.01) |
| *G11B 5/82* | (2006.01) |
| *G11B 5/72* | (2006.01) |
| *G11B 5/00* | (2006.01) |

(52) U.S. Cl.
CPC ............. *G11B 5/725* (2013.01); *G11B 5/72* (2013.01); *G11B 5/82* (2013.01); *G11B 5/8408* (2013.01); *G11B 2005/0021* (2013.01)

(58) Field of Classification Search
CPC .... G11B 5/72; G11B 5/725; G11B 2005/0021
See application file for complete search history.

(56) References Cited

U.S. PATENT DOCUMENTS

| | | |
|---|---|---|
| 3,185,020 A | 5/1965 | Thelen |
| 3,781,090 A | 12/1973 | Sumita |
| 7,106,935 B2 | 9/2006 | Challener |
| 7,251,089 B2 | 7/2007 | Peng |
| 7,688,689 B2 | 3/2010 | Gage et al. |
| 7,796,487 B2 | 9/2010 | Chu et al. |
| 8,018,681 B2 | 9/2011 | Mallary |
| 8,054,737 B2 | 11/2011 | Shintani |
| 8,289,818 B2 | 10/2012 | Taratorin et al. |
| 8,607,439 B1 | 12/2013 | Wang et al. |
| 8,659,291 B2 | 2/2014 | Heidmann |
| 8,771,850 B2 | 7/2014 | Jones et al. |
| 8,787,124 B1 | 7/2014 | Chernyshov et al. |
| 8,792,312 B1 | 7/2014 | Wang et al. |
| 8,811,129 B1 | 8/2014 | Yuan et al. |
| 8,873,352 B1 | 10/2014 | Jandric et al. |

(Continued)

OTHER PUBLICATIONS

English abstract of JP 2000-160178, Japan, Sasaki et al., Jun. 2000, p. 1-2.*

(Continued)

*Primary Examiner* — Holly C Rickman
(74) *Attorney, Agent, or Firm* — Westman, Champlin & Koehler, P.A.

(57) ABSTRACT

An anti-reflection storage medium. The anti-reflection storage medium includes a storage layer and a protective overcoat disposed over the storage later. The protective overcoat has a first refractive index value that is matched to a second refractive index value of the storage layer to reduce reflection of incident light applied to the storage medium when data is written to the storage layer of the storage medium.

10 Claims, 6 Drawing Sheets

(56) References Cited

U.S. PATENT DOCUMENTS

| | | | |
|---|---|---|---|
| 8,953,421 B2 | 2/2015 | Peng et al. | |
| 9,034,564 B1 | 5/2015 | Gao et al. | |
| 9,373,348 B2 | 6/2016 | Seigler et al. | |
| 9,449,627 B2 | 9/2016 | Cao et al. | |
| 9,940,961 B2* | 4/2018 | Ono | G11B 5/65 |
| 2005/0031908 A1* | 2/2005 | Hattori | G11B 5/70605 |
| | | | 428/844.1 |
| 2010/0129686 A1* | 5/2010 | Furuta | G11B 5/72 |
| | | | 428/846 |
| 2012/0140357 A1* | 6/2012 | Yakushiji | G11B 5/746 |
| | | | 360/75 |
| 2013/0155394 A1* | 6/2013 | Saito | G01N 21/03 |
| | | | 356/128 |
| 2013/0279310 A1 | 10/2013 | Zhong | |
| 2014/0192629 A1 | 7/2014 | Zahrt | |

OTHER PUBLICATIONS https://refractiveindex.info (see https://refractiveindex.info/?shelf=main&book=Al2O3&page=Malitson-o with wavelength 0.405), pp. 1-3 (Year: 2019).*

P. Spinelli, B. Macco, M.A. Verschuuren, W. M. M. Kessels, and A. Polman, Applied Physics Letters 102, 233902 (2013), Al2O3/TiO2 nano-pattern antireflection coating with ultralow surface recombination.

Gharibyan, A. et al., Preparation of wide range refractive index diamond-like carbon films by means of plasma-enhanced chemical vapor deposition, Appl Opt. Nov. 1, 2011; 50(31), G69-73.

Dieter Weller, Gregory Parker, Oleksandr Mosendz, Eric Champion, Barry Stipe, Xiaobin Wang, Timothy Klemmer, Ganping Ju, and Antony Ajan, A HAMR Media Technology Roadmap to an Areal Density of 4 Tb/in2, IEEE Transactions on Magnetics, vol. 50, No. 1, Jan. 2014.

Schubert, M. et al, Design of multilayer antireflection coatings made from co-sputtered and low-refractive-index materials by genetic algorithm, Optics Express, vol. 16, No. 8, Apr. 1, 2008, 9 pages.

Salih, K. et al, Multilayer antireflection coatings model for red emission of silicon for optoelectronic applications, Int. J. Nanoelectronics and Materials, vol. 2, No. 1, pp. 109-118, Jan. 2009, 10 pages.

Griot M. Optical Coatings. Textbook sections 5.1-5.34, 1999, 34 pages.

Mouchart, J., Thin film optical coating. 2: Three-layer antireflection coating theory, Applied Optics, vol. 16, No. 10, pp. 2722-2728, Oct. 1977, 7 pages.

* cited by examiner

US 10,643,648 B2

ANTI-REFLECTION DATA STORAGE MEDIUM

Embodiments described below relate to storage media that may be employed in heat assisted magnetic recording (HAMR) data storage devices/systems. In HAMR devices/systems, heating of the storage media may be carried out by, for example, applying radiant energy to the media from any suitable radiant energy source. Examples of radiant energy sources include continuous wave laser sources and pulsed laser sources that provide the radiant energy to the media by producing optical fields, which are directed at the media. When the medium is exposed to a laser beam, for example, undesirable reflection of light from the medium may occur. Different problems that may result from such reflection are discussed further below. To minimize reflection, embodiments of the disclosure provide media with anti-reflection properties. However, prior to providing additional details regarding the different embodiments, a description of illustrative operating environments is provided below.

BACKGROUND

Data storage systems commonly have one or more data storage media and one or more recording heads that read information from and write information to the data storage media. Data storage media may be magnetic storage media, optical storage media, etc. One technology for meeting a demand of increasing the recording density of magnetic recording is heat assisted magnetic recording (HAMR). In HAMR, information bits are recorded on a data storage medium at elevated temperatures. In one HAMR approach, a beam of light is condensed to an optical spot on the storage medium to heat a portion of the medium and thereby reduce a magnetic coercivity of the heated portion. Data is then written to the reduced coercivity region.

SUMMARY

The present disclosure relates to data storage media with anti-reflection properties. Such media may be employed in heat assisted magnetic recording (HAMR) data storage devices/systems.

In one embodiment, an anti-reflection storage medium is provided. The anti-reflection storage medium includes a storage layer and a protective overcoat disposed over the storage later. The protective overcoat has a first refractive index value that is matched to a second refractive index value of the storage layer to reduce reflection of incident light applied to the storage medium when data is written to the storage layer of the storage medium.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments described below relate to storage media that may be employed in heat assisted magnetic recording (HAMR) data storage devices/systems. In HAMR devices/systems, heating of the storage media may be carried out by, for example, applying radiant energy to the media from any suitable radiant energy source. Examples of radiant energy sources include continuous wave laser sources and pulsed laser sources that provide the radiant energy to the media by producing optical fields, which are directed at the media. When the medium is exposed to a laser beam, for example, undesirable reflection of light from the medium may occur. Different problems that may result from such reflection are discussed further below. To minimize reflection, embodiments of the disclosure provide media with anti-reflection properties. However, prior to providing additional details regarding the different embodiments, a description illustrative operating environments is provided below.

Figure 1:
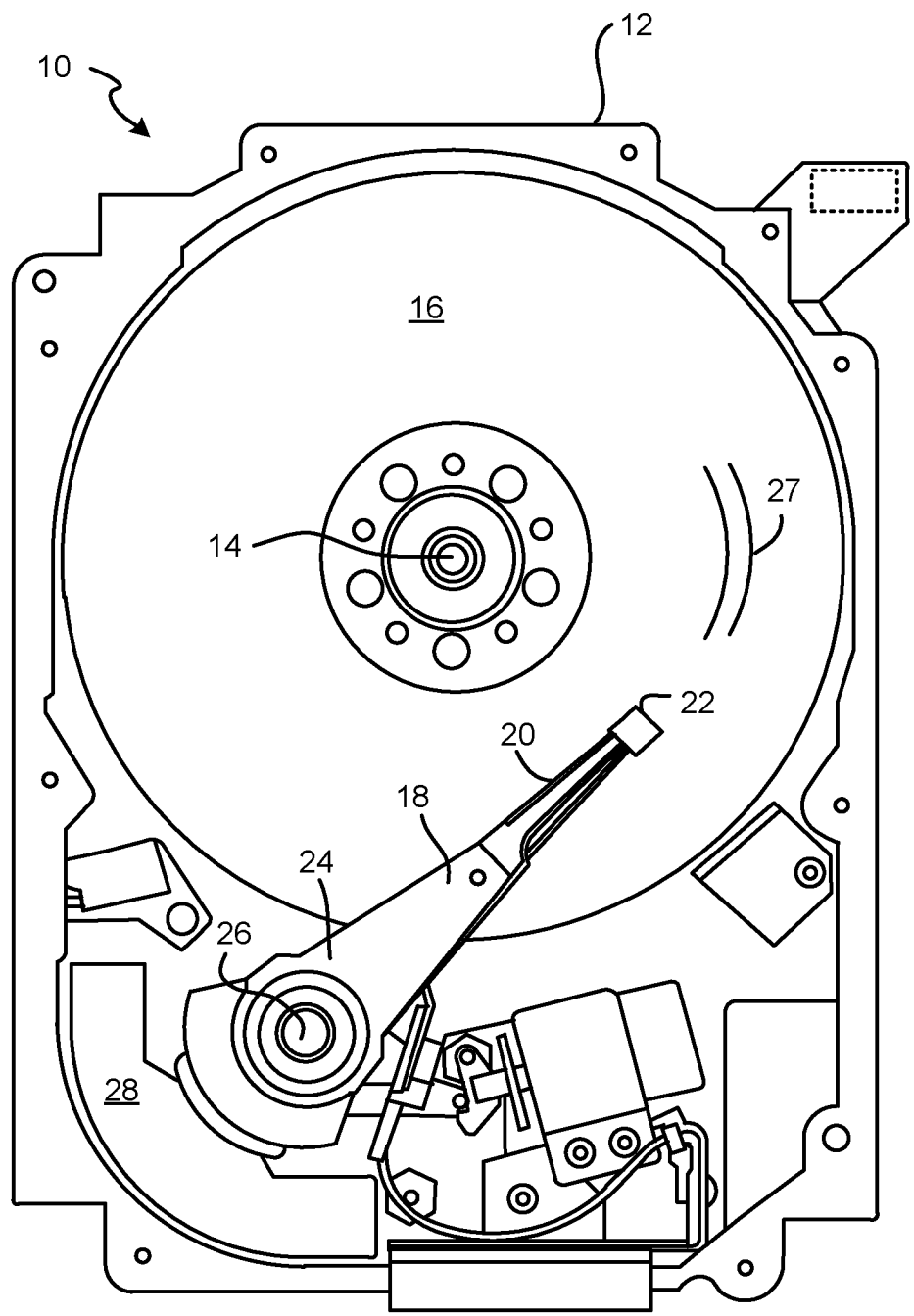
FIG. 1 is a pictorial representation of a disc drive.
Figure 2:
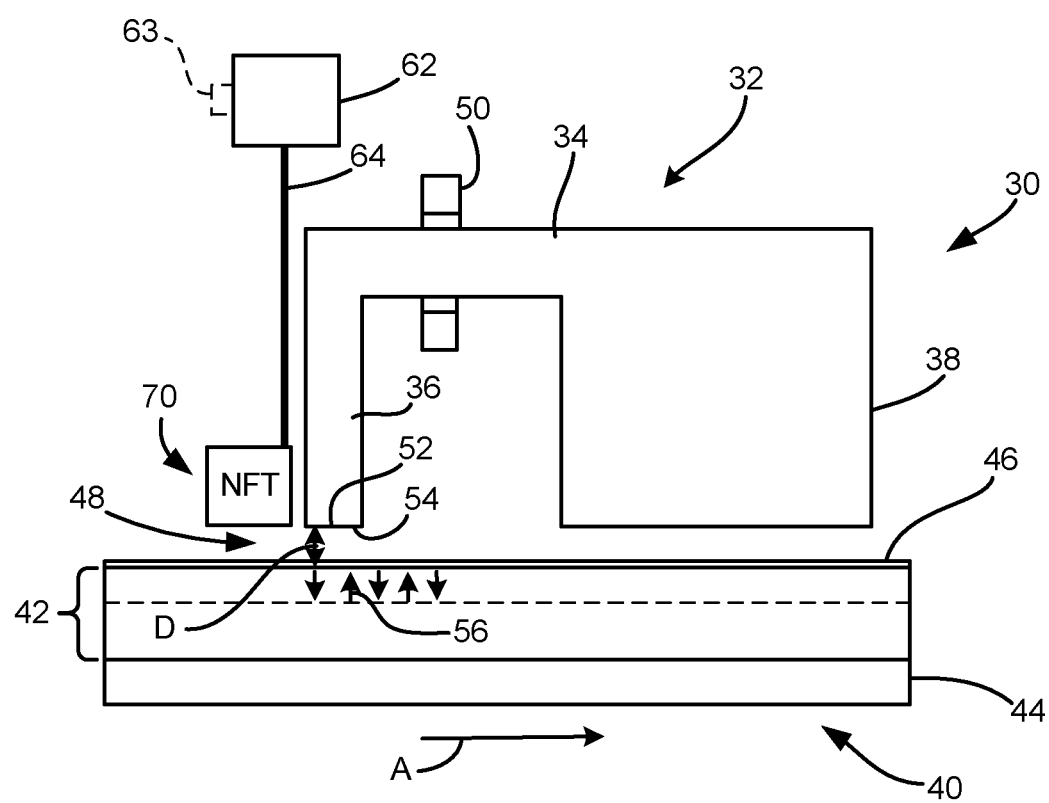
FIG. 2 is a side view of a data storage medium and a recording head, which may be utilized in the disc drive of FIG. 1.

FIGS. 1 and 2 are illustrative operating environments in which certain specific embodiments disclosed herein may be incorporated. The operating environments shown in the figures are for illustration purposes only. Embodiments of the present disclosure are not limited to any particular operating environment such as those shown in FIGS. 1 and 2. Embodiments of the present disclosure are illustratively practiced within any number of different types of operating environments.

FIG. 1 is a pictorial representation of a hard disc drive 10 in which at least some of the present embodiments may be used. Hard disc drives are a common type of data storage system. While embodiments of this disclosure are described in terms of disc drives, other types of data storage systems should be considered within the scope of the present disclosure, such as other storage systems with moving or non-moving storage media.

The disc drive 10 includes a housing 12 (with the upper portion removed and the lower portion visible in this view) sized and configured to contain the various components of the disc drive. The disc drive 10 includes a spindle motor 14 for rotating at least one storage medium (for example, a magnetic storage disc) 16. At least one arm 18 is contained within the housing 12, with the arm 18 having a first end 20 for supporting a recording head or slider 22, and a second end 24 pivotally mounted on a shaft by a hearing 26. An actuator motor 28 is located at the arm's second end 24 for pivoting the arm 18 to position the recording head 22 over a desired sector or track of the disc 16. The actuator motor 28 is controlled by a controller, which is not shown in the interest of simplification.

FIG. 2 is a schematic side view of a perpendicular magnetic recording head 30 and a perpendicular magnetic storage medium 40 constructed in accordance with certain embodiments. The present disclosure is not limited to perpendicular recording heads and perpendicular magnetic storage media. In this example, the recording head 30 includes a magnetic write head 32 that includes a yoke 34 that forms a write pole 36 and a return pole 38. The recording head 30 is positioned adjacent to the perpendicular magnetic storage medium 40 having a storage element 42 supported by a substrate 44. A bearing (for example, an air bearing) 48 separates the recording head 30 from the storage medium 40 by a distance D. A coil 50 is used to control the magnetization of the yoke 34 to produce a write field at an end 52 of the write pole adjacent to a bearing surface 54 of the write head 32. The recording head 30 can also include a read head, which is not shown in the interest of simplification.

The perpendicular magnetic storage medium 40 is positioned adjacent to or under the recording head 30 and travels in the direction of arrow A. As indicated above, the recording medium 40 includes substrate 44, which may be made of any suitable material such as ceramic glass or amorphous glass. Storage element 42 may include one or more magnetic layers that are deposited over the substrate 44. In some embodiments, the storage element 42 may include both soft and hard magnetic layers. The soft magnetic layer may be made of any suitable material such as alloys or multilayers having Co, Fe, Ni, Pd, Pt or Ru, for example. The hard magnetic recording layer is deposited on the soft magnetic layer. In such embodiments, perpendicular magnetic domains 56 are contained in the hard magnetic layer. Suitable hard magnetic materials for the hard magnetic recording layer may include at least one material selected from, for example, FePt or CoCrPt alloys having a relatively high anisotropy at ambient temperature. An overcoat 46 is included over the storage element 42. Details regarding the overcoat 46 are provided further below.

The recording head 30 also includes elements for heating the magnetic storage medium 40 proximate to where the write pole 36 applies the magnetic write field to the storage medium 40. Specifically, the components for heating include a waveguide (for example, an optical fiber) 64 which acts in association with a source 62 of radiant energy and is in optical communication with an optical coupling structure (for example, a near field transducer (NFT)) 70. The radiant energy can be, for example, visible light, infrared, ultra violet or other radiation. The transmitted radiant energy passes from the optical coupling structure 70 to the surface of the storage medium 40 for heating a localized area of the storage medium 40, and particularly for heating a localized area of the hard magnetic layer 42.

The source 62 may be, for example, a laser diode, or other suitable light source. At the surface of the medium 40, the radiant energy is converted into heat in the medium 40. The coupling structure 70 may be spaced apart from the medium 40 by a distance of about 2 nm to about 50 nm. It will be appreciated that the separation distance is also dependent on the fly height required to maintain acceptable reading and writing (electromagnetic coupling for heating) by the recording head 30. Other separation distances can be selected as desired. The write head 32 of FIG. 2 allows for heating of the recording medium 40 in close proximity to the write pole 36, which applies a magnetic write field to the recording medium 40. Locating the optical coupling element 70 adjacent to the write pole 36, may provide increased writing efficiency due to the write field being applied immediately down track from where the recording medium 40 has been heated. The hot spot may raise the temperature of the medium 40 from, for example, ambient temperature to approximately 500° C., for example. The recording takes place at the thermal profile, which can also be called the thermal field or the thermal distribution, in the medium 40 for which the coercivity may be equal to the applied recording field. This thermal profile may be near the edge of the write pole 36 where the magnetic field gradients may be the largest. This may record a substantially sharp magnetic field transition in the medium 40. It should be noted that waveguide 64 may be integrally formed with the write pole 36 or may be implemented in any other desired relationship with the write pole 36 to direct the radiant energy toward the medium 40.

In operation, the recording medium 40 passes under the recording head 30, in the direction indicated by arrow A in FIG. 2. The source 62 transmits radiant energy via the optical fiber 64 to the optical coupling element 70. The optical coupling element 70 transmits the optical energy for heating the storage medium 40. More specifically, a localized area of the recording layer 42 is heated to lower the coercivity prior to the write pole 36 applying a magnetic write field to the recording medium 40. This may allow for higher coercivity storage media to be used while limiting superparamagnetic instabilities that may occur with such recording media used for high recording densities.

At a down-track location from where the medium 40 is heated, the magnetic write pole 36 applies a magnetic write field to the medium 40 for storing magnetic data in the recording medium 40. The write field is applied while the recording medium 40 remains at a sufficiently high temperature for lowering the coercivity of the recording medium 40. This may help the write pole 36 to provide a sufficient or high enough magnetic write field to perform a write operation on the recording medium 40.

The heating area in the storage layer determines the dimensions of the data bit. In order to achieve high areal data density, it is useful to achieve high optical power coupling efficiency. The optical coupling power efficiency may be negatively impacted if reflection of light occurs when the storage medium is exposed to a laser beam from, for example, the NFT. Problems due to reflection of light from the medium include:

instability of the diode laser when the reflected light returns to the laser diode mounted on a slider that carries the recording head;

diminishing of the NFT electromagnet wave energy as the reflected light interferes with the electromagnetic waves at the NFT;

undesirable spreading of the high energy spot on the storage medium;

reduction in a thermal profile gradient on the storage medium, which disfavors sharp data transitions;

diminishing of the quality and effectiveness of the NFT laser as some of the incident light is reflected rather than absorbed by the medium magnet;

mode hopping of the input which introduces unwanted intensity noise that impacts wavelength, power, energy and spreading and causes variations in the location of data written to the disc.

Embodiments described below include anti-reflection features in the data storage media, thereby helping minimize/eliminate the above-noted problems.

Figure 3A:
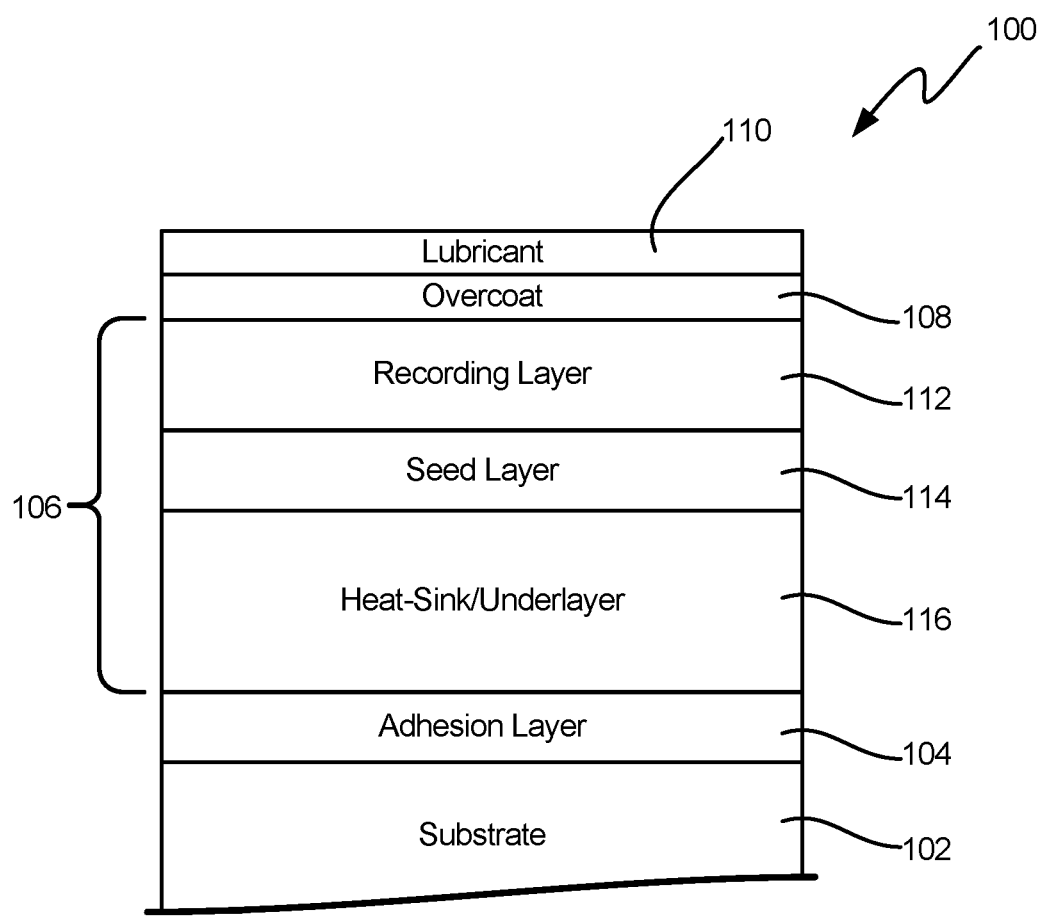
FIG. 3A is a diagrammatic illustration of a data storage medium, which includes an anti-reflection overcoat in accordance with one embodiment.

FIG. 3A is a diagrammatic illustration of a data storage medium 100, which includes an anti-reflection overcoat in accordance with one embodiment. As can be seen in FIG. 3A, data storage medium 100, which may be used in HAMR applications, includes a substrate 102, an adhesion layer 104, a disc magnet 106, a protective overcoat 108 and a lubricant film 110. In the embodiment shown in FIG. 2A, disc magnet 106 includes a recording layer 112, a seed layer 114 and a heat-sink/underlayer 116. As indicated above, recording layer 112 may be formed of FePt, CoCrPt, etc., and substrate 102 may be formed of ceramic glass, amorphous glass, etc. Lubricant film 110 may comprise perfluoropolyether (PFPE) or any other suitable material. Seed layer 114 may comprise MgO or any other suitable material. Example materials that can be used to form heat-sink/underlayer 116 include Au, Al, Cu and Cr. Adhesion layer 104 may comprise NiAl or any other suitable material.

In some embodiments, a beam of light is condensed to an optical spot on the storage medium 100 to heat a portion of the medium 100 and thereby reduce a magnetic coercivity of the heated portion just before data is written to that portion. As noted above, overcoat 108 is configured to minimize reflection of light from the storage medium 100. In one embodiment, to minimize medium light reflectivity, a refractive index value of the overcoat 108 is matched to a refractive index value the magnetic recording layer 112. This may be carried out by carefully tuning the composition, thickness, reflectivity and transmitivity of the overcoat. Matching of refractive index values of layers of interest is needed because one layer is influenced by optical properties of at least an adjacent layer in the stack. A formula that may be utilized as a basis for determining a refractive index value of the overcoat 108 that matches a refractive index value of the magnetic recording layer 112 is described below in connection with FIG. 3B.

Figure 3B:
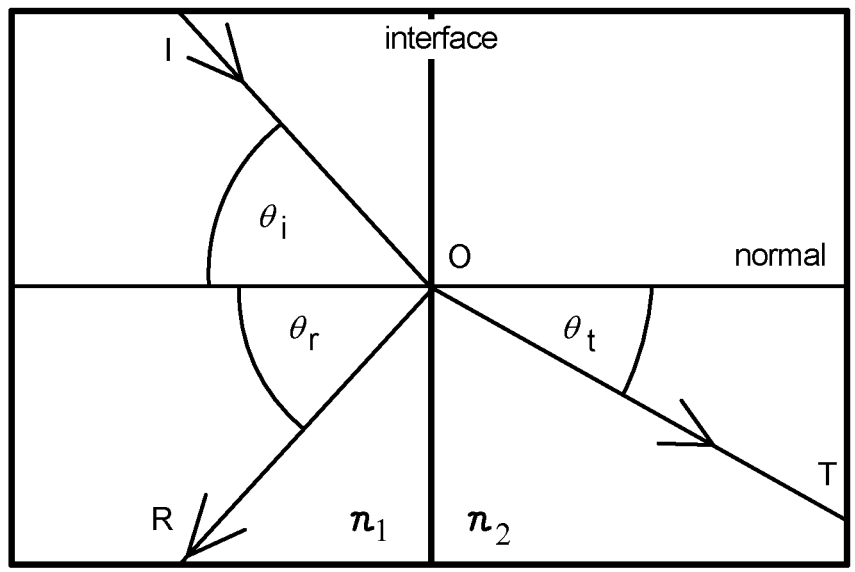
FIG. 3B is a diagrammatic illustration showing an interface between two layers.

For a 2-layer interface shown in FIG. 3B, the total reflection R is $$R = \frac{1}{2}(R_s + R_p) \quad \text{Equation 1}$$

$$R_s = \left|\frac{n_1\cos\theta_i - n_2\cos\theta_t}{n_1\cos\theta_i + n_2\cos\theta_t}\right|^2 = \left|\frac{n_1\cos\theta_i - n_2\sqrt{1-\left(\frac{n_1}{n_2}\sin\theta_i\right)^2}}{n_1\cos\theta_i + n_2\sqrt{1-\left(\frac{n_1}{n_2}\sin\theta_i\right)^2}}\right|^2 \quad \text{Equation 2}$$

$$R_p = \left|\frac{n_1\cos\theta_t - n_2\cos\theta_i}{n_1\cos\theta_t + n_2\cos\theta_i}\right|^2 = \left|\frac{n_1\sqrt{1-\left(\frac{n_1}{n_2}\sin\theta_i\right)^2} - n_2\cos\theta_i}{n_1\sqrt{1-\left(\frac{n_1}{n_2}\sin\theta_i\right)^2} + n_2\cos\theta_i}\right|^2 \quad \text{Equation 3}$$

In the above equations, R is the total reflection (i.e., the combined reflection resulting from both layers), Rs is s-polar reflection, Rp is p-polar reflection, $n_1$ is the refractive index value of the first layer and $n_2$ is the refractive index value of the second layer. As noted above, R needs to be minimized. Using the 2-layer interface approach for minimizing reflection from data storage medium 100 shown in FIG. 3A involves treating overcoat 108 as the first layer and magnetic recording layer 112 as the second layer. Thus, in this approach, $n_1$ is the refractive index value of the overcoat 108 and $n_2$ is the refractive index value of magnetic recording layer 112. A composition and thickness of the magnetic recording layer 112 may be predetermined and therefore $n_2$ will depend on those predetermined values. Therefore, the composition and thickness of the overcoat 108 may be tuned to provide a value of $n_1$ that results in minimizing R for the combination of overcoat 108 and magnetic recording layer 112 (i.e., $n_1$ is matched with $n_2$).

In some embodiments, the refractive index value of the overcoat 108 may generally be between the refractive index value of the underling magnetic recording layer 112 and a refractive index value of the lubricant film 110. In such embodiments, the lubricant film 110 may comprise PFPE and may have a refractive index value that is less than about 1.38. Overcoat 108 may comprise one or more of:

amorphous carbon having a refractive index value between about 1.38 and about 2.8, $MgF_2$ having a refractive index value between about 1.37 and about 1.38, $SiO_2$ having a refractive index value between about 1.45 and about 1.46, $Al_2O_3$ having a refractive index value between about 1.56 and about 1.65, Silicon monoxide having a refractive index value between about 1.93 and about 1.97, Yttrium fluoride having a refractive index value of about 1.51, Zinc Selenide (ZnSe) having a refractive index value of about 2.41, Beryllium oxide having a refractive index value between about 1.71 and about 1.72, $ThF_4$ having a refractive index value between about 1.51 and about 1.52, $LaF_3$ having a refractive index value of about 1.6, LiF having a refractive index value of about 1.39, $AlF_4$ having a refractive index value of about 1.35, $CeF_3$ having a refractive index value of about 1.615, MgO having a refractive index value between about 1.72 and about 1.74, $NdF_3$ having a refractive index value of about 1.60, $ThOH_2$ having a refractive index value of about 1.70, $InO_2$ having a refractive index value between about 1.8 and about 1.9, Barium Fluoride ($BaF_2$) having a refractive index value between about 1.47 and about 1.48, Calcium Fluoride ($CaF_2$) having a refractive index value of about 1.43, a mixture of MgO and $Al_2O_3$ having a refractive index value between about 1.72 and about 1.65, etc.

For an amorphous carbon overcoat, foreign atoms like hydrogen (H), nitrogen (N), fluorine (F), transition metals (for example, Cr, Au, Si and Pd) etc., of a bonded or an unbonded state may be incorporated into the structure to tune the refractive index value of the overcoat. Specifically, the overcoat 108 may comprise amorphous carbon whose composition, sp3/sp2 bonding ratio and contents of bonded/unbonded foreign atoms (for example, H, Si, N, F or transition metals such as Cr, Au, Si, Pd, etc.) are altered to tune the refractive index value of the overcoat 108 to be between about 1.38 to about 2.8. Examples of such alterations in amorphous carbon structures are shown in FIGS. 3C and 3D, which illustrate sp3 and sp2 hybridization configurations, respectively.

Figure 3C:
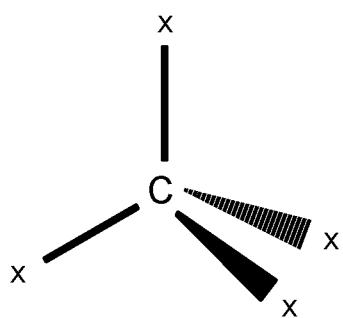
FIGS. 3C and 3D are diagrammatic illustrations showing chemical structures of an anti-reflection layer that may be utilized in the embodiment of FIG. 3A.

To produce the configuration shown in FIG. 3C, carbon's 2s and all three of its 3p orbitals hybridize to form four sp3 orbitals. These orbitals then bond with four atoms of element X (where X is, for example, H, Si, N, F or a transition metal) through sp3-s orbital overlap. The resulting shape is tetrahedral, since that minimizes electron repulsion.

Figure 3D:
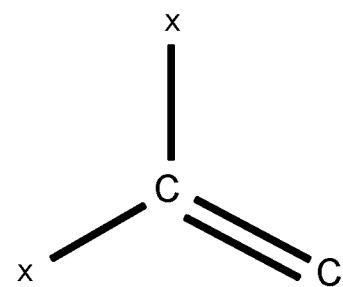

To produce the configuration shown in FIG. 3D, for each carbon atom, one 2s orbital and 2p orbitals hybridize to form three sp2 orbitals. These hybridized orbitals align themselves in a trigonal planar structure. For each carbon, two of the sp orbitals bond with two 1 s X orbitals (where X is, for example, H, Si, N, F or a transition metal) through s-sp overlap. The remaining sp2 orbitals on each carbon are bonded with each other, forming a bond between each carbon through sp1-sp2 orbital overlap. This leaves two p orbitals on each carbon that have a single carbon in them.

These orbitals form bonds through p-p orbital overlap, creating a double bond between the two carbons.

Energy deposition techniques for preparing an overcoat 108 of the type described above include chemical vapor deposition, physical vapor deposition, ion-beam deposition, cathodic arc plasma deposition, and other vacuum deposition techniques for thin films, which may be carried out in high vacuum chambers.

In the above-described embodiments, overcoat 108 is described as being a single-layered structure. However, in some embodiments, overcoat 108 may comprise multiple layers. Such embodiments are described below in connection with FIG. 4.

Figure 4:
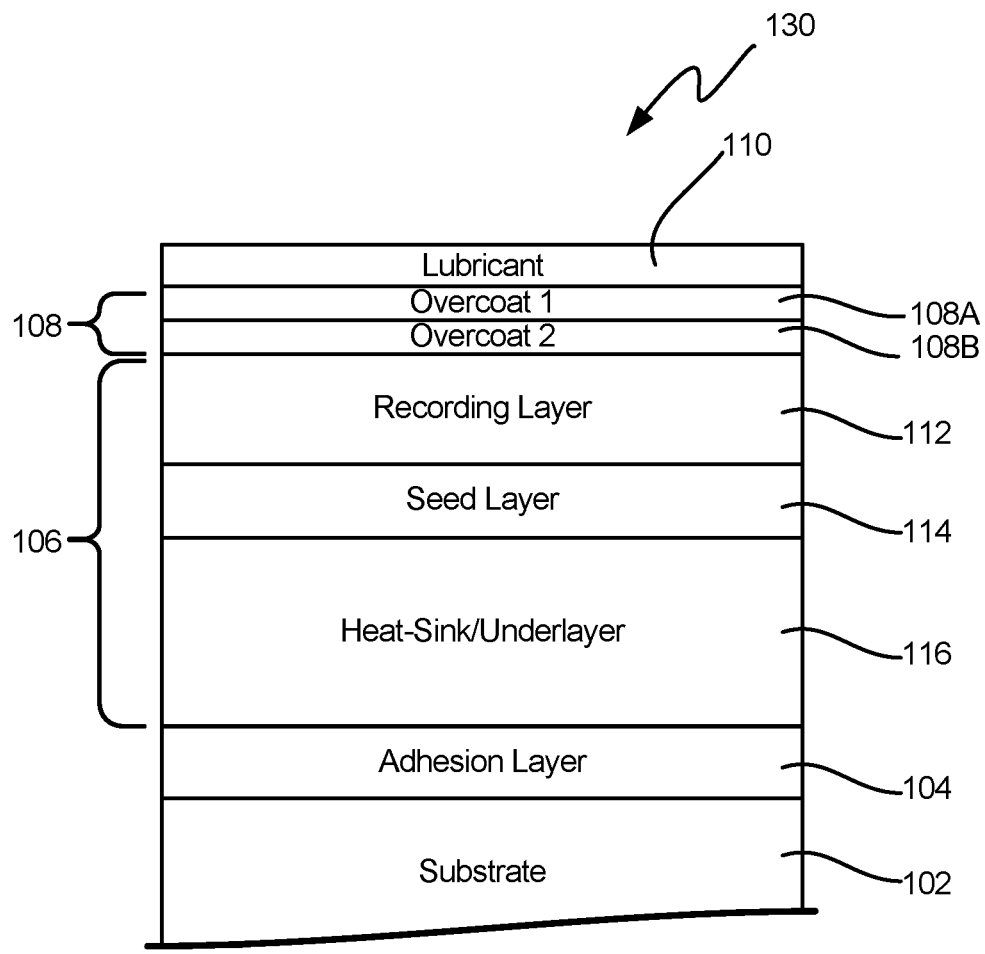
FIG. 4 is a diagrammatic illustration of a data storage medium, which includes a bi-layered anti-reflection overcoat in accordance with one embodiment.

FIG. 4 is a diagrammatic illustration of a data storage medium 130, which includes a multi-layered anti-reflection overcoat in accordance with one embodiment. In data storage medium 130, anti-reflection overcoat 108 is a bi-layered structure that includes an upper overcoat layer 108A and a lower overcoat layer 108B. In other respects, data storage medium 130 is similar to data storage medium 100 (of FIG. 3A). Therefore, in the interest of brevity, a description of the similar elements is not repeated. It should be noted that overcoat 108 may include more than two layers in some embodiments. In general, any number of layers formed of any suitable materials may be utilized in different embodiments.

In the embodiment of FIG. 4, bi-layered overcoat 108 is formed by first depositing lower overcoat layer 108B over magnetic recording layer 112 and then depositing second upper overcoat layer 108A over lower overcoat layer 108B. Refractive index values of layers 108A and 108B are finely tuned to minimize the total reflectivity of the disc magnet 106 and to also enhance absorption of the disc magnet 106. As noted above, in some embodiments, overcoat 108 may include more than two layers. In embodiments in which overcoat 108 includes multiple layers, materials such as diamond-like carbon, $MgF_2$, $SiO_2$, $Al_2O_3$, silicon monoxide, yttrium fluoride, Zinc Selenide (ZnSe), Beryllium oxide, $ThF_4$, $LaF_3$, LiF, $AlF_4$, $CeF_3$, MgO, $NdF_3$, $ThOH_2$, $lnO_2$, Barium Fluoride ($BaF_2$), Calcium Fluoride ($CaF_2$), a mixture of MgO and $Al_2O_3$, etc., may be used as interleaving compositions of the antireflective coating. The refractive index values of the example materials provided in connection with overcoat 108 of FIG. 4A that includes multiple layers may be the same as the refractive index values of the example materials listed above in connection with the single-layered overcoat of FIG. 3A.

A formula that may be utilized as a basis for determining refractive index values of overcoat layers 108A and 108B that match a refractive index value of the magnetic recording layer 112 is included below.

$$n_0 = \frac{n_1^2 n_s}{n_2^2} \quad \text{Equation 4}$$

In Equation 4, $n_0$ is the optimum refractive index value for the combination of overcoat layers 108A and 108B and magnetic recording layer 112, $n_1$ is the refractive index value of the upper overcoat layer 108A, $n_2$ is the refractive index value of the lower overcoat layer 108B and $n_s$ is the refractive index value of the magnetic recording layer 112. As noted above, a composition and thickness of the magnetic recording layer 112 may be predetermined and therefore $n_s$ will depend on those predetermined values. Therefore, the composition and thickness of overcoat layers 108A and 108B may be tuned to provide a values of $n_1$ and $n_2$ that result in the optimum refractive index value no for the combination of overcoat layers 108A and 108B and magnetic recording layer 112 (e.g., $n_1$ and $n_2$ are matched with $n_s$).

In overcoat layer designs that employ more than two anti-reflection layers, calculations to determine suitable refractive index values for individual layers may be carried out using any suitable mathematical modeling technique. One technique may involve carrying out a series of matrix multiplications in which each matrix corresponds to a single layer. The results obtained from the multiplications may be used to mathematically model the reflection-related performance of the multi-layered structure.

In addition to the above-described formula-based techniques for obtaining minimum reflectivity for designing data storage media used in HAMR, minimum reflectivity may also be determined experimentally using a photo detector that may be embedded in a slider body. A suitable test storage medium may be employed for such experimental purposes. It should be noted that, in addition to being used for experimental purposes, the photo detector may also be employed in the disc drive (such as 10 of FIG. 1) for carrying out antireflection-related measurements. In the disc drive (such as 10 of FIG. 1), such measurements are made by the photo detector (or other similar device on the head/slider) based on reflected light from the medium. It should be noted that the reflected light from the medium is also related to the intensity and angle of the incident light. An example of a photo detector 63 is shown adjacent to source 62 (for example, a laser diode) in FIG. 2. In some embodiments, no photo detector such as 63 is included in the disc drive head/slider.

Figure 5:
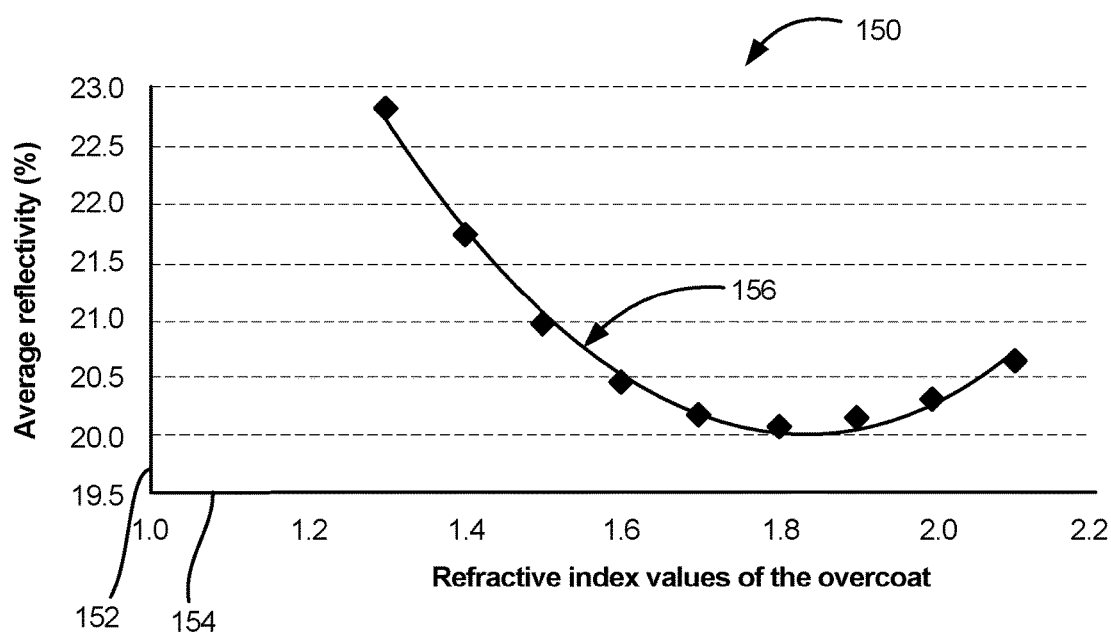
FIG. 5 is a graph of experimental results related to reflectivity of overcoat layers.

FIG. 5 is a graph 150 of results obtained based on mathematical calculations. The results graphically shown in FIG. 5 are calculated reflectivity values obtained in response to a 788 nanometer (nm) laser beam being incident on a data storage medium having a FePt magnetic recording layer with a refractive index value of 3.3 and an overcoat of varying refractive index values. In graph 150, a vertical axis 152 represents average reflectivity in percentage and horizontal axis 154 represents refractive index values of the overcoat. Plot 156 is a curve that connects different points on the graph 150. As can be seen in FIG. 5, a lowest reflectivity is achieved when the refractive index value of the overcoat is 1.8.

Figure 6A:
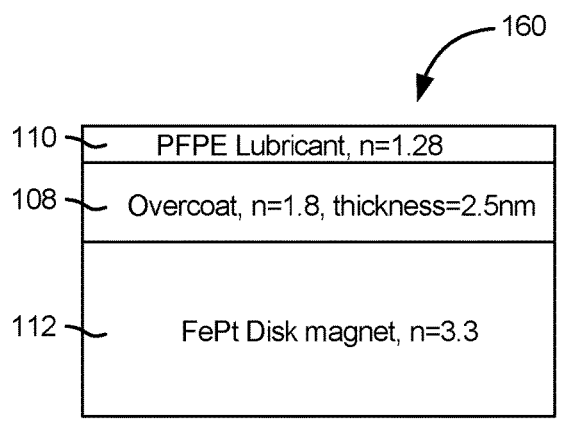
FIGS. 6A and 6B are diagrammatic illustrations of data storage media having anti-reflection overcoats.
Figure 6B:
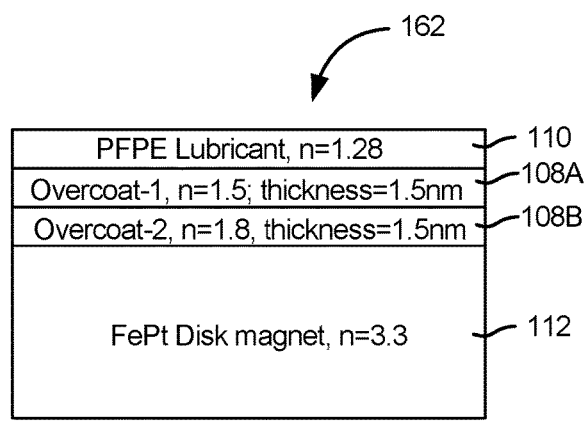

FIGS. 6A and 6B diagrammatic illustrations of portions of data storage media that include overcoat layers having refractive index values that are suitable for reducing reflectivity of the data storage media. In FIG. 6A, data storage medium 160 includes a FePt magnetic storage layer 112 having a refractive index value of 3.3. Medium 160 includes a single-layered overcoat 108 having a thickness of 2.5 nm and a refractive index value of 1.8. A PFPE lubricant film 110 on the overcoat 108 has a refractive index value of 1.28. In FIG. 6B, storage layer 112 and lubricant layer 110 of data storage medium 162 are the same as those included in data storage medium 160 of FIG. 6A. However, medium 162 includes a bi-layered overcoat with the upper overcoat layer 108A having a thickness of 1.5 nm and a refractive index value of 1.5 and the lower overcoat layer 108B having a thickness of 1.5 nm and a refractive index value of 1.8.

Theoretical calculated results were obtained for a 780 nm infrared laser beam applied in a direction perpendicular to storage media 160, 162 and a storage medium (note shown) without PFPE lubrication and overcoat layers magnetic storage layer 112. Total reflectivity for the medium with the magnetic storage layer 112 and without the PFPE lubrication layer 108 and the overcoat layer 110 was found to be 53.5%. With layers 108 and 110, the reflectivity from medium 160 was about 14.6% and the reflectivity from medium 162 was about 8.6%.

Although various uses of the anti-reflection overcoat layer are disclosed in the application, embodiments are not limited to those disclosed in the application. It is to be understood that even though numerous characteristics of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the elements may vary depending on the application for the anti-reflection overcoat layer while maintaining substantially the same functionality without departing from the scope and spirit of the present disclosure. In addition, although the embodiments described herein are directed to anti-reflection overcoat layers utilized in a certain data storage systems, it will be appreciated by those skilled in the art that the teachings of the present disclosure can be applied to other data storage devices, such as optical devices, without departing from the scope and spirit of the present disclosure. Further, the teachings of the present disclosure can be applied to longitudinal recording media. In addition to the above-described techniques for heating the storage media, other suitable techniques such as microwave heating may be used to heat the media.

What is claimed is:

1. An anti-reflection storage medium comprising:
a plurality of layers with each one of the plurality of layers having a different refractive index value, the plurality of layers comprising:
    a storage layer that comprises a highest refractive index value of the different refractive index values;
    a protective overcoat layer in direct contact with the storage layer, the protective overcoat layer comprising at least one of magnesium fluoride ($MgF_2$), yttrium fluoride, zinc selenide (ZnSe), and barium fluoride ($BaF_2$); and
    a lubricant layer in direct contact with the protective overcoat layer, the lubricant layer having a lowest refractive index value of the different refractive index values; and
the different ones of the plurality of layers stacked in descending order of refractive index value to provide the anti-reflection property of the storage medium.

2. The anti-reflection medium of claim 1 and wherein the storage layer comprises FePt.

3. The anti-reflection storage medium of claim 1 and wherein the protective overcoat layer is a single layer between the storage layer and the lubricant layer.

4. The anti-reflection storage medium of claim 1 and wherein the protective overcoat layer is a multi-layered structure with at least first and second layers, the first layer comprising at least one of $MgF_2$, yttrium fluoride, Zinc Selenide (ZnSe), and Barium Fluoride ($BaF_2$).

5. The anti-reflection storage medium of claim 4 and wherein the second protective overcoat layer comprises amorphous carbon.

6. The anti-reflection storage medium of claim 5 and wherein the amorphous carbon protective overcoat layer comprises foreign atoms of at least one of H, Si, N, F or transition metals comprising at least one of Cr, Au, Si or Pd.

7. The anti-reflection storage medium of claim 6 and wherein the carbon atoms of the amorphous carbon protective overcoat layer and the foreign atoms are bonded together in at least one of sp3 hybridization configurations or sp2 hybridization configurations.

8. The anti-reflection storage medium of claim 6 and wherein the foreign atoms incorporated into the amorphous carbon protective overcoat layer are in an unbonded state in the amorphous carbon protective overcoat layer.

9. The anti-reflection storage medium of claim 4 and wherein the second protective overcoat layer comprises at least one of $MgF_2$, $SiO_2$, $Al_2O_3$, silicon monoxide, yttrium fluoride, Zinc Selenide (ZnSe), Beryllium oxide, $ThF_4$, $LaF_3$, LiF, $AlF_4$, $CeF_3$, MgO, $NdF_3$, $ThOH_2$, $InO_2$, Barium Fluoride ($BaF_2$), Calcium Fluoride ($CaF_2$) or a mixture of MgO and $Al_2O_3$.

10. The anti-reflection medium of claim 5 and wherein the refractive index of the second protective overcoat layer is between about 1.38 to about 2.8.

* * * * *